(12) United States Patent
Johnson et al.

(10) Patent No.: US 9,298,648 B2
(45) Date of Patent: Mar. 29, 2016

(54) METHOD AND SYSTEM FOR I/O FLOW MANAGEMENT USING RAID CONTROLLER WITH DMA CAPABILITY TO DIRECTLY SEND DATA TO PCI-E DEVICES CONNECTED TO PCI-E SWITCH

(71) Applicant: LSI CORPORATION, San Jose, CA (US)

(72) Inventors: Stephen B. Johnson, Colorado Springs, CO (US); Brad D. Besmer, Colorado Springs, CO (US); Lawrence J. Rawe, Colorado Springs, CO (US); Gerald E. Smith, Boulder, CO (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 0 days.

(21) Appl. No.: 14/096,256

(22) Filed: Dec. 4, 2013

(65) Prior Publication Data
US 2014/0337540 A1 Nov. 13, 2014

Related U.S. Application Data

(60) Provisional application No. 61/820,913, filed on May 8, 2013.

(51) Int. Cl.
*G06F 3/00* (2006.01)
*G06F 13/14* (2006.01)
*G06F 3/14* (2006.01)

(52) U.S. Cl.
CPC .. *G06F 13/14* (2013.01); *G06F 3/14* (2013.01)

(58) Field of Classification Search
CPC ....................................................... G06F 3/14
USPC ................ 710/308, 310, 5, 22; 711/114, 154
See application file for complete search history.

(56) References Cited

U.S. PATENT DOCUMENTS

| 7,536,508 | B2* | 5/2009 | Davies ......................... 711/114 |
| 8,260,980 | B2* | 9/2012 | Weber et al. .................... 710/22 |
| 8,510,519 | B2* | 8/2013 | Cho ............................... 711/154 |
| 8,589,723 | B2* | 11/2013 | Kumar et al. ................. 714/4.5 |
| 8,943,226 | B1* | 1/2015 | Hoglund et al. ................. 710/5 |
| 2013/0024595 | A1* | 1/2013 | Subramaniyan et al. ..... 710/308 |
| 2013/0275672 | A1* | 10/2013 | Bert .............................. 711/114 |
| 2014/0189212 | A1* | 7/2014 | Slaight et al. ................. 711/103 |

* cited by examiner

*Primary Examiner* — Tammara Peyton
(74) *Attorney, Agent, or Firm* — Duft Bornsen & Fettig (57) ABSTRACT

Disclosed is a system and method for generating IO in PCIe devices and flow management of the IO.

17 Claims, 9 Drawing Sheets

FIG. 1

Table 1 NVMe/Device Queues

| Queue | Identifier | Owner | Usage |
|---|---|---|---|
| Admin Queue | 0 | PL | Administrator requests to NVMe device, including the creation of NVMe Submission/Completion Queue Pairs. This queue will be created when the NVMe device is discovered. |
| PL IO Queue Pair | 1 | PL | Normal IO queue for PL generated IO. This queue will be created when the NVMe device is discovered. |
| Host Direct IO Queue Pair | 2 | Host Driver | Normal IO queue for Host generated IO. This queue will be created upon host request. |

METHOD AND SYSTEM FOR I/O FLOW MANAGEMENT USING RAID CONTROLLER WITH DMA CAPABILITIY TO DIRECTLY SEND DATA TO PCI-E DEVICES CONNECTED TO PCI-E SWITCH

FIELD OF THE INVENTION

The field of the invention relates generally to performance of PCIe storage devices. These may include different protocols or bridges, including, but not limited to PCIe SAS/SATA RAID ASIC, PCIe Ethernet/IB (RoCE, iWARP, RDMA) RAID ASIC and PCIe RAID ASIC.

BACKGROUND OF THE INVENTION

RAID (redundant array of independent disks) is a storage technology that combines multiple disk drive components into a logical unit. Data is distributed across the drives in one of several ways called "RAID levels", depending on the level of redundancy and performance required.

RAID is used as an umbrella term for computer data storage schemes that can divide and replicate data among multiple physical drives: RAID is an example of storage virtualization and the array can be accessed by the operating system as one single drive. The different schemes or architectures are named by the word RAID followed by a number (e.g. RAID 0, RAID 1). Each scheme provides a different balance between the key goals: reliability and availability, performance and capacity. RAID levels greater than RAID 0 provide protection against unrecoverable (sector) read errors, as well as whole disk failure.

A disk array controller is a device which manages the physical disk drives and presents them to the computer as logical units. As is understood, a disk drive is a common term that includes, but is not limited to NAND Flash SSD's and other non-volatile memory devices. It almost always implements hardware RAID, thus it is sometimes referred to as RAID controller. It also often provides additional disk cache. A disk array controller name is often improperly shortened to a disk controller. The two should not be confused as they provide very different functionality.

SUMMARY OF THE INVENTION

Embodiments of the invention may therefore comprise a method of generating an IO flow in a system comprising a plurality of target devices, a PCIe switch, a host component, a Raid on a Chip component and two or more associated memories wherein a first of the two or more associated memories is associated with the host component and a second of the two or more associated memories is associated with the Raid on a Chip component, the method comprising building an IO command at a first component of the system one of the associated memories, enqueuing the command at the first component of the system in one of the plurality of target devices, sending the command to the one of the plurality of target devices, via the one of said associated memories, direct memory accessing the one of the one the target devices, and via the one of the target devices, writing a completion entry to the one of the one or more memories.

Embodiments of the invention may further comprise a system for generating an IO flow, the system comprising a first controller device and a second controller device, wherein one of the first and said second controller devices is a host device and one of the first and the second controller devices is a Raid on a Chip device, two or more associated memories, wherein a first of the two or more associated memories is associated with each of the first controller device and the second controller device, a PCIe switch, and a plurality of target devices, wherein at least one of the first and second controller devices is enabled to build an IO command at the associated memory, enqueue the command at one of said plurality of target devices and send the command to one of the plurality of target devices, the two or more associated memories are enabled to direct memory access data between said plurality of target devices, and the target device is enabled to write a completion entry to the one of the one or more memories.

DETAILED DESCRIPTION OF THE EMBODIMENTS

A disk array controller is a device which manages the physical disk drives and presents them to the computer as logical units. It almost always implements hardware RAID, thus it is sometimes referred to as RAID controller. It also often provides additional disk cache. A disk array controller name is often improperly shortened to a disk controller. The two should not be confused as they provide very different functionality.

An SAS RAID on a Chip (RoC or ROC) controller provides SCSI and SATA performance functionalities to host adapters, workstations and server designs. A RoC controller may support internal and external storage devices allowing a system to support enterprise-class SAS drives and desktop-class SATA drives. A RoC controller can connect to drives directly and can use expanders to connect to additional drives. A RoC device may provide PCIe host interface, SAS or SATA ports and a full RAID implementation.

SSDs have been made using the PCI Express bus before, but using non-standard specification interfaces. By standardizing the interface of the SSDs, with standards such as NVMe and SCSIe, operating systems only need one driver to work with all SSDs adhering to the specification. It also means that each SSD manufacturer doesn't have to use resources to design specific interface drivers. This is similar to how hard disks are built to follow the SATA specification and work with all computers, with no per-hard disk driver needed. Historically, most SSDs have used busses such as SATA, SAS or Fibre Channel. SATA has been the most typical way to connect SSDs in the personal computer, but SATA was designed for mechanical hard disk drives, and has become increasingly inadequate as SSDs have improved. For example, unlike hard disk drives, some SSD are limited by the maximum throughput of SATA.

PCI Express (Peripheral Component Interconnect Express), officially abbreviated as PCIe, is a high-speed serial computer expansion bus standard designed to replace the older PCI, PCI-X, and AGP bus standards. PCI Express operates in consumer, server, and industrial applications, as a motherboard-level interconnect (to link motherboard-mounted peripherals), a passive backplane interconnect and as an expansion card interface for add-in boards. In PCs, from consumer laptops and desktops to enterprise data servers, the PCIe bus serves as the primary motherboard-level interconnect, connecting the host system-processor with both integrated-peripherals (surface-mounted ICs) and add-on peripherals (expansion cards.) Peripheral components include storage and networking. Storage devices are protocol bridges i.e SAS, FC. IB and direct attached solid state storage. i.e. NVMe, AHCI and SCSIe SSD's. In most of these systems, the PCIe bus co-exists with one or more legacy PCI buses, for backward compatibility with the large body of legacy PCI peripherals.

A non-transparent bridging (NTB) function enables isolation of two hosts or memory domains yet allows status and data exchange between the two hosts or sub-systems. A non-transparent bridge is functionally similar to a transparent bridge in that both provide a path between two independent PCI buses (or PCI or PCIe busses). The key difference is that when a non-transparent bridge is used, devices on the downstream side (relative to the system host) of the bridge are not visible from the upstream side. This allows an intelligent controller on the downstream side to manage devices there, making them appear as a single controller to the system host. The path between the two buses allows the devices on the downstream side to transfer data directly to the upstream side of the bus without directly involving the intelligent controller in the data move. Thus, transactions are forwarded across the bus unfettered just as in a P2P Bridge, but the resources responsible are hidden from the host, which sees a single device. A non-transparent bridge can also be used to link a secondary host with the hierarchy of a primary host. It provides isolation while allowing communications between the two systems. A non-transparent bridge typically includes doorbell registers to send interrupts from each side of the bridge to the other and scratchpad registers accessible from both sides for inter-processor communications. Upon failure of the primary host, the non-transparent bridge resources allow access by the secondary host to reconfigure the system so that it can take over as host.

Further regarding bridges, a transparent bridge provides electrical isolation between PCI busses. The host enumerates the system through discovery of bridges and end devices. For transparent bridges (TB), a Configuration Status Register (CSR) with a "Type 1" header informs the processor to keep enumerating beyond this bridge as additional devices lie downstream. These Bridges with Type 1 headers include CSR registers for primary, secondary and subordinate bus numbers, which, when programmed by the host, define the CSR addresses of all downstream devices. Endpoint devices have a "Type 0" header in their CSRs to inform the enumerator (BIOS or processor) that no additional devices lie downstream. These CSRs include base address registers (BARs) used to request memory and I/O apertures from the host. In addition to the electrical isolation the non-transparent bridge (NTB) adds logical isolation by providing processor domain partitioning and address translation between the memory-mapped spaces of these domains. With the NTB, devices on either side of the bridge are not visible from the other side, but a path is provided for data transfer and status exchange between the processor domains.

PCIe interfaces/switches are useful in providing expansion to the number of PCIe ports available to a controller. As is understood, PCIe slots are a Peripheral Component Interconnect Express slots that provide expanded bandwidth and are compatible with existing operating systems. PCI Express is a serial connection that operates more like a network than a bus. Instead of one bus that handles data from multiple sources. PCIe has a switch that controls several point-to-point serial connections. These connections fan out from the switch, leading directly to the devices where the data needs to go. Every device has its own dedicated connection, so devices no longer share bandwidth like they do on a normal bus.

Serial Attached SCSI (SAS) is a point-to-point serial protocol that is used to move data to and from computer storage devices such as hard drives and tape drives. An SAS domain is the SAS version of a SCSI domain—it consists of a set of SAS devices that communicate with one another through of a service delivery subsystem. Each SAS port in a SAS domain has a SCSI port identifier that identifies the port uniquely within the SAS domain. It is assigned by the device manufacturer, like an Ethernet device's MAC address, and is typically world-wide unique as well. SAS devices use these port identifiers to address communications to each other. In addition, every SAS device has a SCSI device name, which identifies the SAS device uniquely in the world. One doesn't often see these device names because the port identifiers tend to identify the device sufficiently.

NVMe is Non-Volatile Memory Express is a specification for accessing solid state drives (SSDs) on a PCIe bus. NVM Express is an optimized, high performance, scalable host controller interface with a streamlined register interface and command set designed for enterprise and client systems that use PCI Express SSDs. NVMe reduces latency and provides faster performance, with support for security and end-to-end data protection. While Advanced Host Controller Interface (AHCI) interface has the benefit of legacy software compatibility, it does not deliver optimal performance when talking to a PCI Express SSD. This is because AHCI was developed at a time when the purpose of the Host Bus Adapter (HBA) in a system was to connect the CPU/memory subsystem with the much slower storage subsystem based on rotating magnetic media. Such an interface has some inherent inefficiency when applied to SSD devices, which behave much more like DRAM than spinning media. NVM Express is a scalable host controller interface designed to address the needs of Enterprise and Client systems that utilize PCI Express based solid state drives. The interface provides an optimized command issue and completion path. It includes support for parallel operation by supporting up to 64K command queues within an I/O Queue. Additionally, support has been added for many Enterprise capabilities like end-to-end data protection (compatible with T10 DIF and DIX standards), enhanced error reporting, and virtualization.

SCSI Express (SCSIe) is a standard for a storage interface that runs commands over a PCI Express (PCIe) link. SCSI Express defines an interface, command set and feature set that will take full advantage of multi-core architectures, optimizing driver stacks so they can handle the high IOPS associated with solid state storage.

Figure 1:
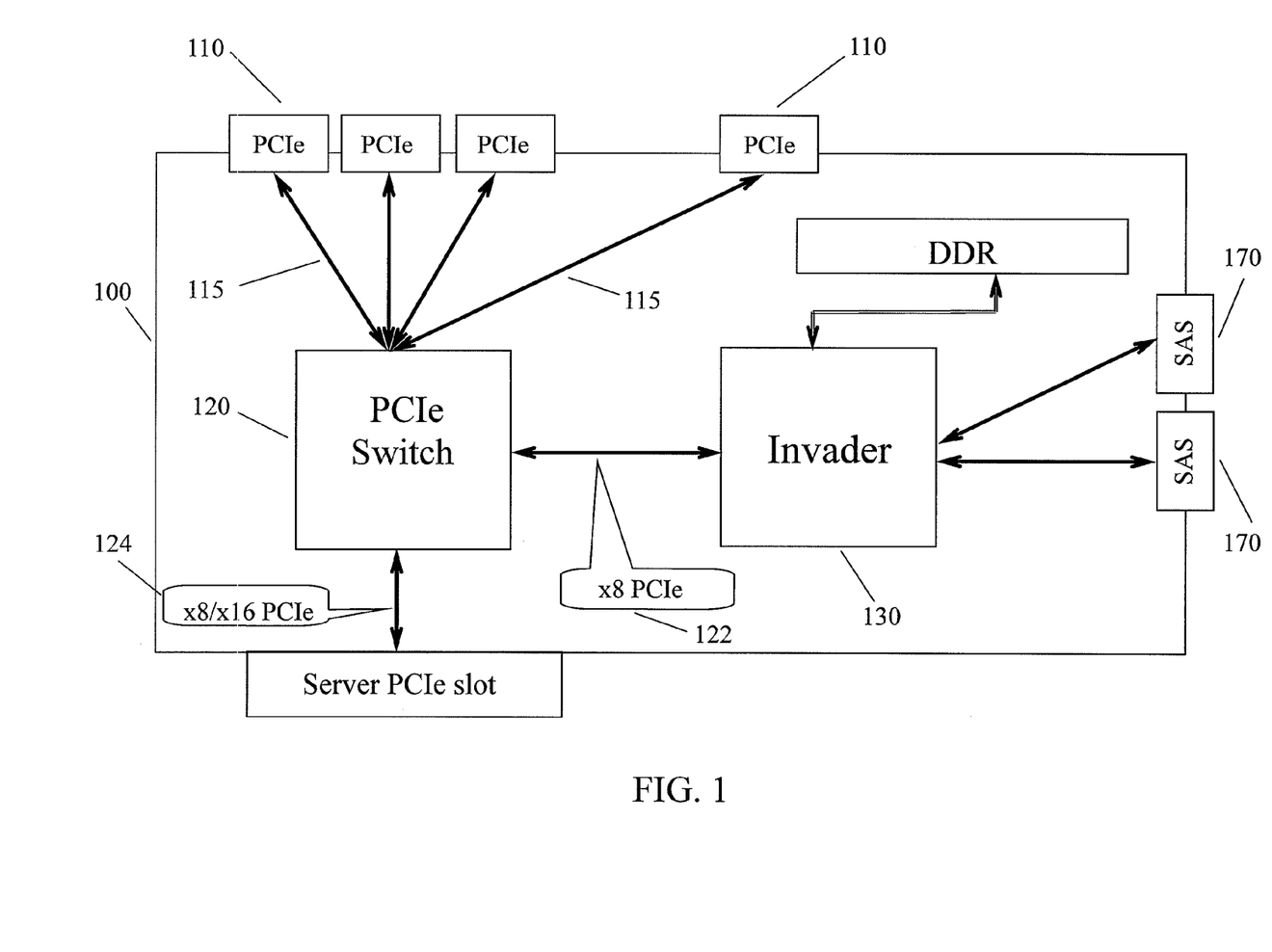
FIG. 1 is a block diagram of a system for a switch architecture.

FIG. 1 is a block diagram of a system for a switch architecture. The system 100 comprises a series of PCIe connections 110. The PCIe connections 110 connect internally 115 in the system 100 to a PCIe switch 120. The PCIe connections 110 provide connection to 8639 NVMe targets. The PCIe switch 120 communicates with a RAID controller 130. A RAID controller is an ASIC that is a bridge between PCIe and SAS.SATA. A RAID controller device will have a dedicated hardware engine to perform RAID operations along with embedded firmware to manage the RAID operations and manage the SAS/SATA disk. The RAID controller device may be configured as a PCIe root complex to that it can control the PCIe SSDs connected to the switch. The communication 122 between the PCIe switch 120 and the RAID controller 130 may be an x8 PCIe parallel bus architecture. The PCIe switch 120 also communicates with a server PCIe slot 140 via a x8 or x16 PCEe parallel bus architecture 124.

In the system of FIG. 1 the system controllers may have an 8-port SAS core, located in the RAID controller, along with support for a front-side PCIe switch 120 to provide access to up to 32 PCIe, as well as SAS/SAT A devices or SCSIe devices. PCIe functionality may be controlled within the NVMe functional area of firmware running on the RAID controller. This includes 110 handling, SCSI 110 PCIe command translation, NVMe encapsulated message handling, and NVMe initialization functions.

A significant amount of the NVMe functional area functionality revolves around I/O handling. It is understood that this may comprise more common, or normal, read/write type O/O handling, or the SCSI-NVMe Translation functionality. Accordingly, the SCSI I/O functional area is one of the main firmware functional areas that the NVMe area will interact with. The other primary interaction is performed by the firmware Device Manager for the NVMe initialization. The NVMe functional area presents interfaces for handling SCSI to NVMe command translation, performing the operations required for NVMe initialization, handling NVMe I/O errors and modifying the NVMe specific Hardware settings.

Figure 2:
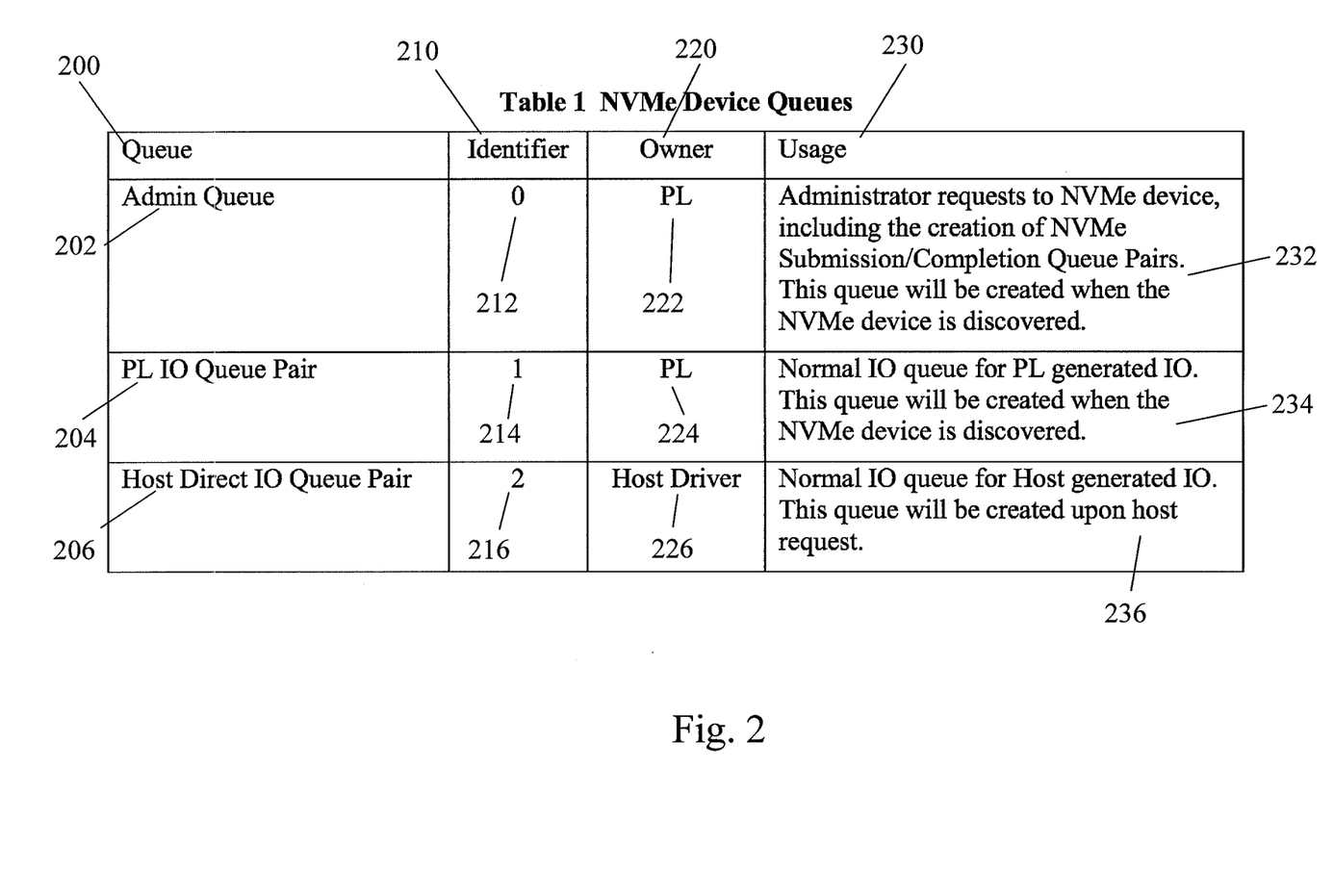
FIG. 2 shows a table of NVMe Device queues.
Figure 3:
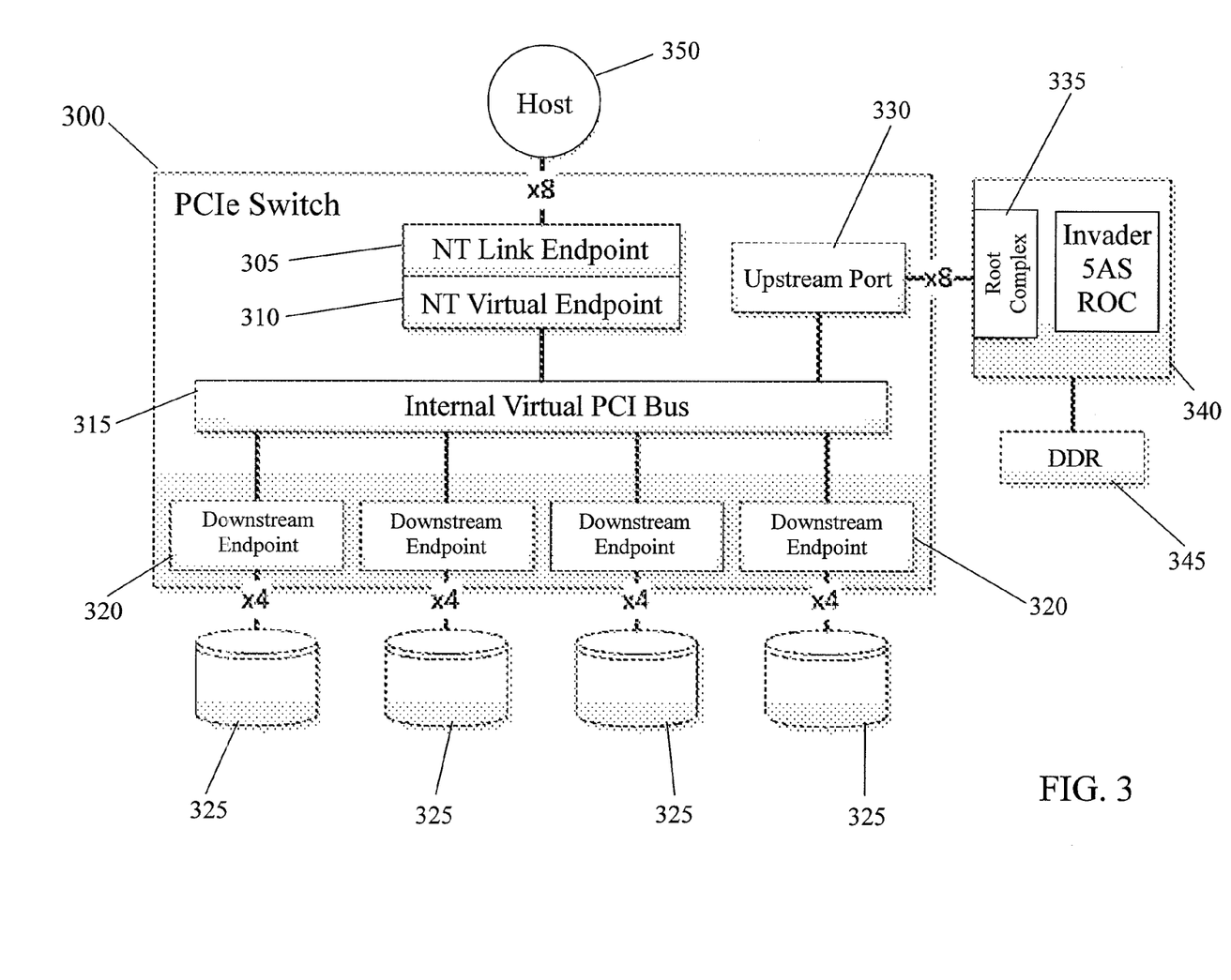
FIG. 3 is a diagram of a PCIe Switch.

NVMe target devices are PCIe device types supported in embodiments of the invention. In many instances, architectural embodiments may support SOP (SCSIe) target devices. Those skilled in the art, after reading this disclosure, will understand how to utilize SOP (SCSIe) target devices. In many instances, architectural embodiments of the invention may support AHCI target devices. Those skilled in the art, after reading this disclosure, will understand how to utilize AHCI target devices. A difference between AHCI and NVMe is that AHCI does not generally provide multiple Operational Queues like SOP and NVMe do. In essence, this requires that all I/O be submitted to the ROC and no direct I/O is possible Table 1 of FIG. 3 shows a table of NVME Device queues. A Queue 200 may be an Admin Queue 202, a PL I/O Queue Pair 204 and a Host Direct I/O Queue Pair 206. An identifier 210 is respectively associated with each Queue 200 respectively, Id 1 212, Id 1 214 and Id 2 216. Each owner 220 is likewise identified for each Queue 200, PL 222 for the Admin Queue 202, PL 224 for the PU/O Queue Pair 204 and Host Driver 226 for the Host Direct I/O Queue Pair 206. A usage description 232 of the Admin Queue 202 is provided as: Administrator requests to NVMe device, including the creation of NVMe Submission/Completion Queue Pairs. This queue will be created when the NVMe device is discovered.

NVMe submission and completion queue pairs and SCSIe in/out queues operate similarly with respect to the I/O flow (see FIGS. 3-9). The ROC and Operating system each have dedicated queue pairs where commands or messages can be sent and completed asynchronously and completely independent of each other. The ROC FW will create three queue pairs for each NVMe device. These queues and pairings are summarized in Table 1.

FIG. 3 is a diagram of a PCIe Switch. The PCIe switch 300 comprises a NT Link Endpoint 305 and an NT virtual endpoint 310. The Endpoints 305, 310 connect to an internal virtual PCI bus 315 which in turn connects to a series of downstream endpoints 320. The downstream endpoints connect to a series of drives 325. The internal Virtual PCI bus 315 also connects to an upstream port 330 which in turn connects to an RAID controller SAS ROC 340. The RAID controller SAS ROC 340 comprises a root complex 335 for receiving the inputs from the upstream port 330. A host 350 generates the I/O directly to the PCIe Switch 300.

The PCIe switch 300 is configured to be used as a non-transparent bridge. In essence, this means that the host will see a PCIe endpoint. The ROC and the NVMe PCIe devices will be on the virtual link side of the NT-bridge 305, 310 and will not be directly visible to the host 350.

There are two entities that may generate an I/O. The host driver 350 and the ROC itself may generate I/O. These I/O's may specify an SGL that is sourced, or destined, for either host 350 memory space or the ROC DDR memory 345. Table 2 is a table of the expected I/O flows and references. As noted, there are two I/O sources, the Host 350 or the ROC 340. The host 350 may be a device type of a PCI or a SAS/SATA or ROC DDR. The ROC 340 may be a PCI or a SAS/SATA device type. The data source/destination column of Table 2 indicates which Figure of this specification provides a description of that particular arrangement. For example, a host I/O source with a PCI device type and host memory space sourcing, or destination, will be illustrated in FIG. 4.

In FIG. 3, and throughout the other figures in this description, the term DDR may be used to identify a type of memory associated with the host, such as 350 in FIG. 3, or the Raid on a Chip, 340 in FIG. 3. As is understood, a DDR is a double data rate class of memory often associated with a synchronous dynamic random access memory or other type of memory. A DDR SDRAM, for instance, will make higher transfer rates possible by more control of the timing of the electrical data and clock signals than a SDR SDRAM, single data rate SDRAM, for example. Accordingly, use of a term like "host DDR" or "RoC DDR" in this description is understood to include "host memory" and "RoC Memory" and is understood to be inclusive of any and all types of memories capable of being associated with a host or a RoC.

Figure 4:
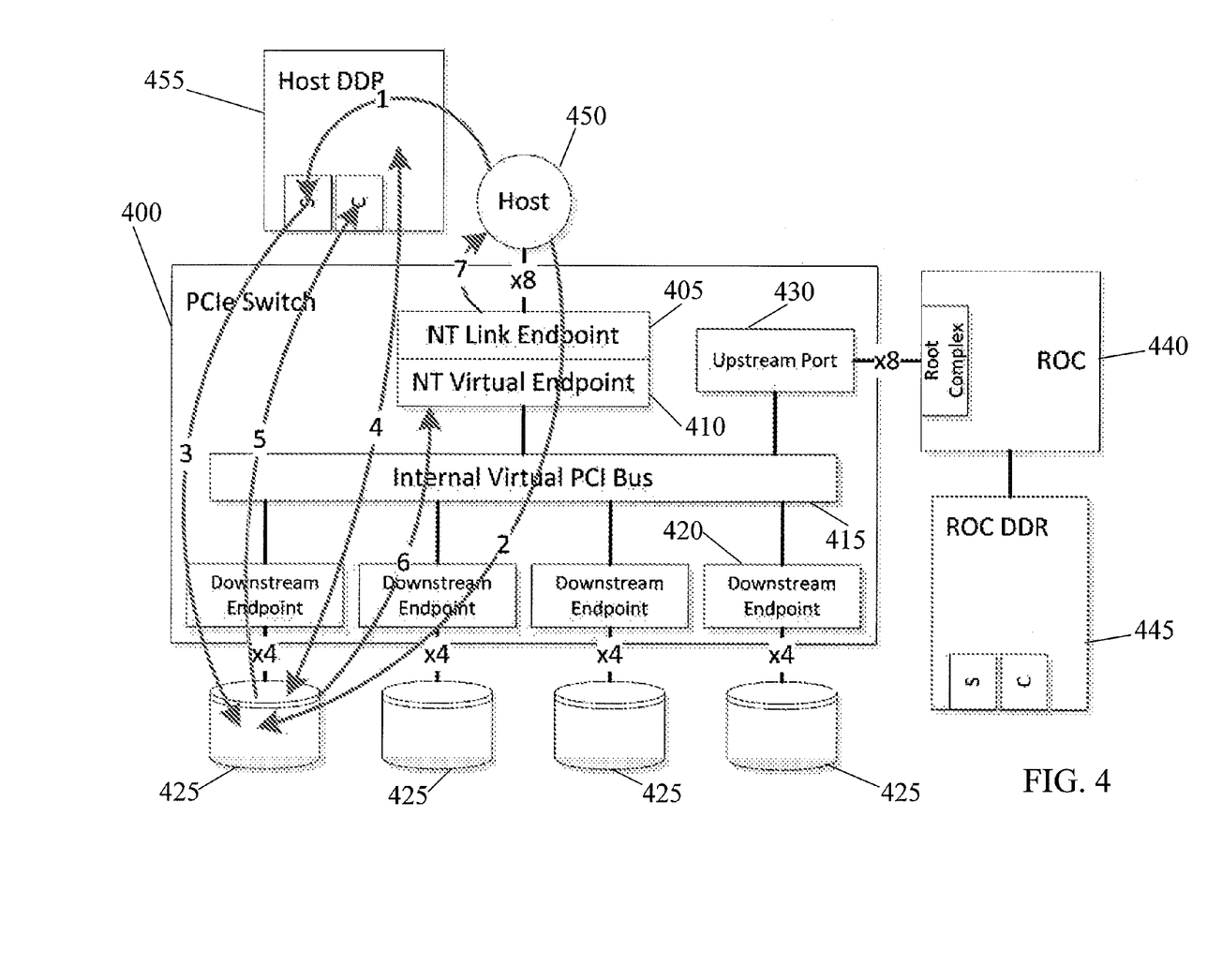
FIG. 4 shows a flow diagram for I/O that is generated by a host driver and is submitted directly to a PCI device.

FIG. 4 shows a flow diagram for I/O that is generated by a host driver and is submitted directly to a PCI device. The SGL specified a source or destination buffer that resides in the host memory space. The PCIe switch 400 comprises a NT Link Endpoint 405 and an NT virtual endpoint 410. The Endpoints 405, 410 connect to an internal virtual PCI bus 415 which in turn connects to a series of downstream endpoints 420. The downstream endpoints connect to a series of drives 425. The internal Virtual PCI bus 415 also connects to an upstream port 430 which in turn connects to an RAID controller SAS ROC 440. The RAID controller SAS ROC 440 comprises a root complex 435 for receiving the inputs from the upstream port 430. A host 450 generates the I/O directly to the PCIe Switch 400.

Continuing with FIG. 4, a plurality of flows are also shown. As noted, an I/O is generated by the host driver and is submitted directly to the PCI device 400. In flow 1, the host builds a Command (w/Host SGL). SGL is a scatter gather list for NVMe which may include PRP. As shown, flow 1 is from the Host 450. Vectored I/O, also known as scatter/gather I/O, is a method of input and output by which a single procedure-call sequentially writes data from multiple buffers to a single data stream or reads data from a data stream to multiple buffers. The buffers are given in a vector of buffers. Scatter/gather refers to the process of gathering data from, or scattering data into, the given set of buffers. Vectored I/O can operate synchronously or asynchronously. The main reasons for using vectored I/O are efficiency and convenience. An example of flow 1 is block read/write commands that consist of an LBA range and the system memory locations to read or write from (SGL). In flow 2, the host 450 enqueues a request to a drive 425. In NVMe, the drives contain one or more queue pairs that are used to send commands to the drive from the host or RAID controller, in this case, and to receive completions back from the target device (SSD) after the command has been complete. In flow 3, the Host DDR 455 makes a Direct Memory Access (DMA) request of the drive 425. In flow 4, the drive 425 responds to the DMA request in flow 3 and either sends data to the Host DDR 455 or receives data from the Host DDR 455. In flow 5, the drive 425 writes a completion entry to the Host DDR 455. In flow 6, the drive 425 sends an MSI-x interrupt message to the NT Virtual Endpoint 4210 of the PCIe switch 400. In flow 7, the PCIe switch 400 sends an MSI interrupt to the Host 450. MSI and MSIx are PCIe specification features, and functionalities, that allow a device to interrupt the host system/CPU/OS/Driver in order to provide information regarding a necessary step, for example, I/O completion.

Figure 5:
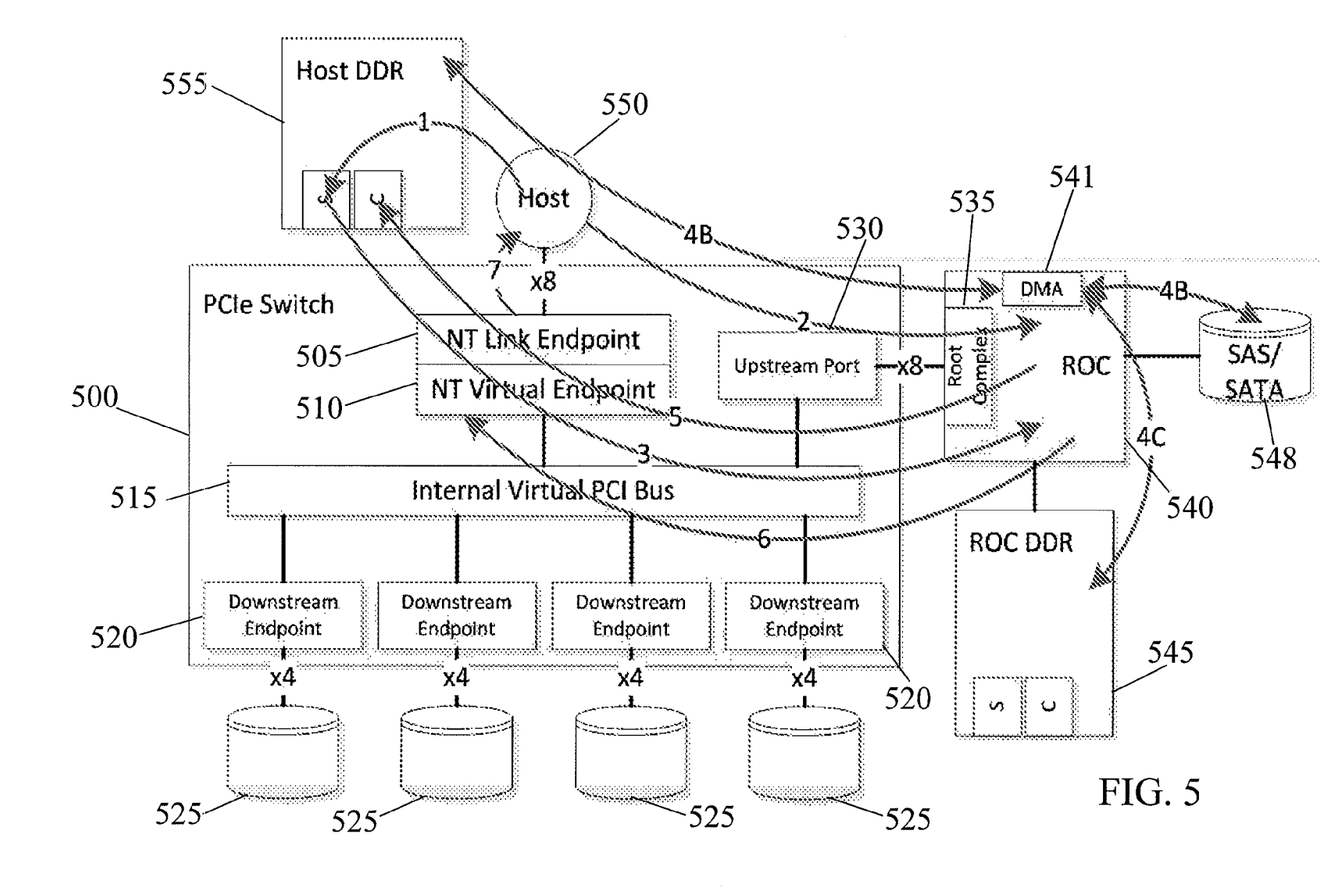
FIG. 5 is a flow diagram indicating an I/O that is generated by the host driver and submitted to a ROC device.

FIG. 5 is a flow diagram indicating an I/O that is generated by the host driver and submitted to the ROC device. The SGL specified a source or destination buffer that resides in the host memory space. The PCIe switch 500 comprises a NT Link Endpoint 505 and an NT virtual endpoint 510. The Endpoints 505, 510 connect to an internal virtual PCI bus 515 which in turn connects to a series of downstream endpoints 520. The downstream endpoints connect to a series of drives 525. The internal Virtual PCI bus 515 also connects to an upstream port 530 which in turn connects to an RAID controller SAS ROC 540. The RAID controller SAS ROC 540 comprises a root complex 535 for receiving the inputs from the upstream port 530. A host 550 generates the I/O directly to the PCIe Switch 500.

Continuing with FIG. 5, a plurality of flows is also shown. As noted, an I/O is generated by the host driver and is submitted to the ROC device. The data may be sourced from either an SAS/jSATA device 548 or ROC DDR 545. The SGL will specify a source or destination buffer that resides in the Host 550 memory space. In flow 1, of FIG. 5, the host 550 builds a command. In flow 2, the Host 550 enqueues a Request to the ROC 540. In flow 3, the Host DDP 555, the ROC 540 makes a Direct Memory Access request of the Host DDR 555. In flow 4, the ROC 540 responds to the DMA request in flow 3 and either sends data to the Host DDR 555 or the ROC DDR 545. The exchange with the Host DDR 555 is shown with flow 4B and the exchange with the ROC DDR 545 is shown with flow 4C. In flow 5, the ROC 540 writes a completion entry to the Host DDR 555. In flow 6, the ROC 540 sends and MSI-x interrupt message to the PCIe switch 500. In flow 7 the PCIe switch 500 sends an MSI interrupt message to the Host 550.

Figure 6:
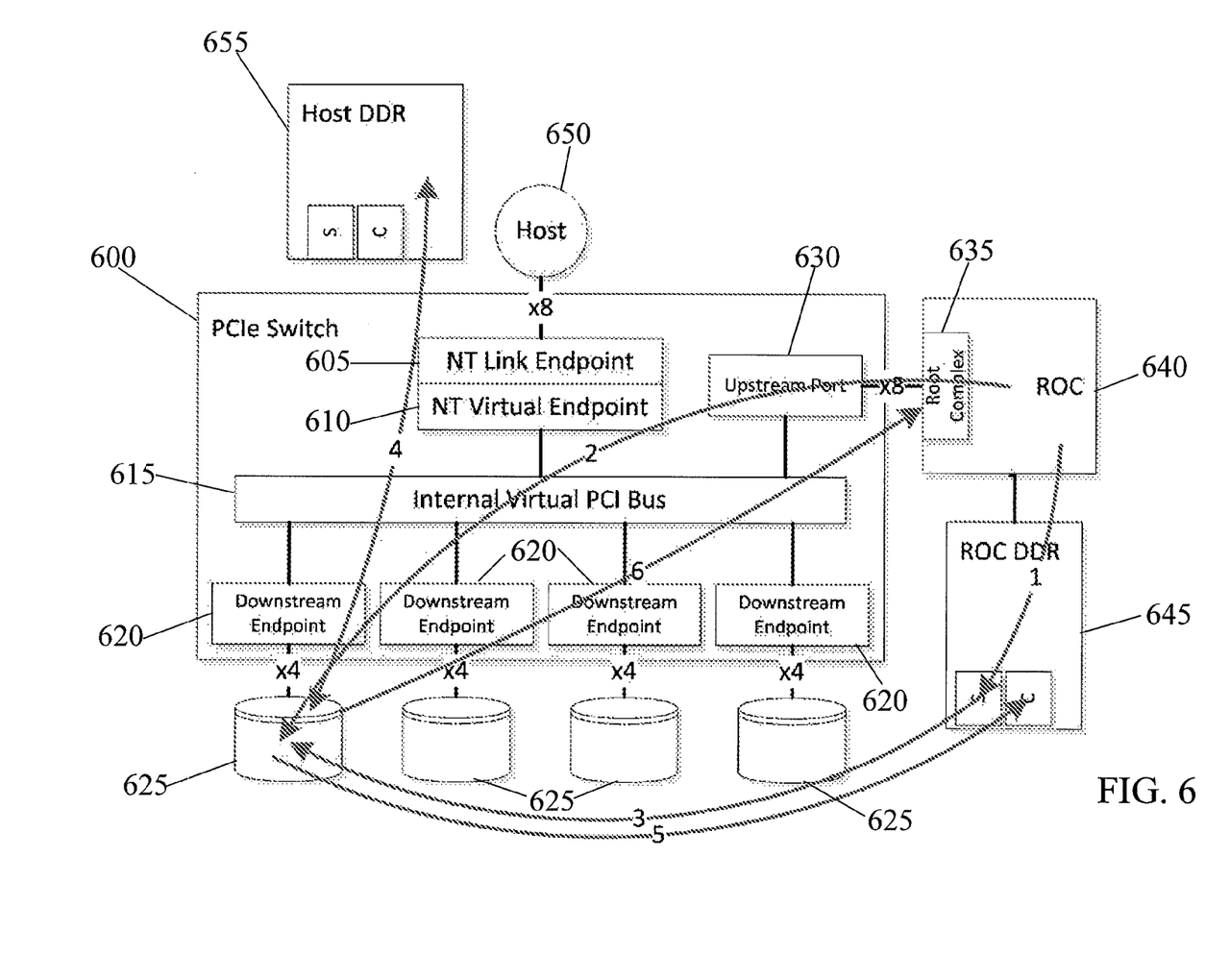
FIG. 6 shows a flow diagram indicating an I/O that is generated by the ROC and is submitted directly to the PCI device.

FIG. 6 shows a flow diagram indicating an I/O that is generated by the ROC and is submitted directly to the PCI device. The SGL specifies a source or destination buffer that resides in the Host 650. The PCIe switch 600 comprises a NT Link Endpoint 605 and an NT virtual endpoint 610. The Endpoints 605, 610 connect to an internal virtual PCI bus 615 which in turn connects to a series of downstream endpoints 620. The downstream endpoints connect to a series of drives 625. The internal Virtual PCI bus 615 also connects to an upstream port 630 which in turn connects to an RAID controller SAS ROC 640. The RAID controller SAS ROC 640 comprises a root complex 635 for receiving the inputs from the upstream port 630. A host 650 generates the I/O directly to the PCIe Switch 600.

Continuing with FIG. 6, a plurality of flows is also shown. As noted, the SGL specifies a source or destination buffer that resides in the Host memory. In flow 1, of FIG. 6, the ROC 640 builds a command (w/ Host SGL) for the ROC DDR 645. In flow 2 the ROC 640 enqueues a request to a drive 625. In flow 3, the drive 625 receives a direct memory access request from the ROC DDR 645. In flow 4, in response to the flow 3 request, the drive 625 provides direct memory access data to, and/or from, the Host DDR 655. In flow 5 the drive 625 writes a completion entry to the ROC 640. In flow 6 the drive 625 sends an MSI-x Interrupt to the ROC 640.

Figure 7:
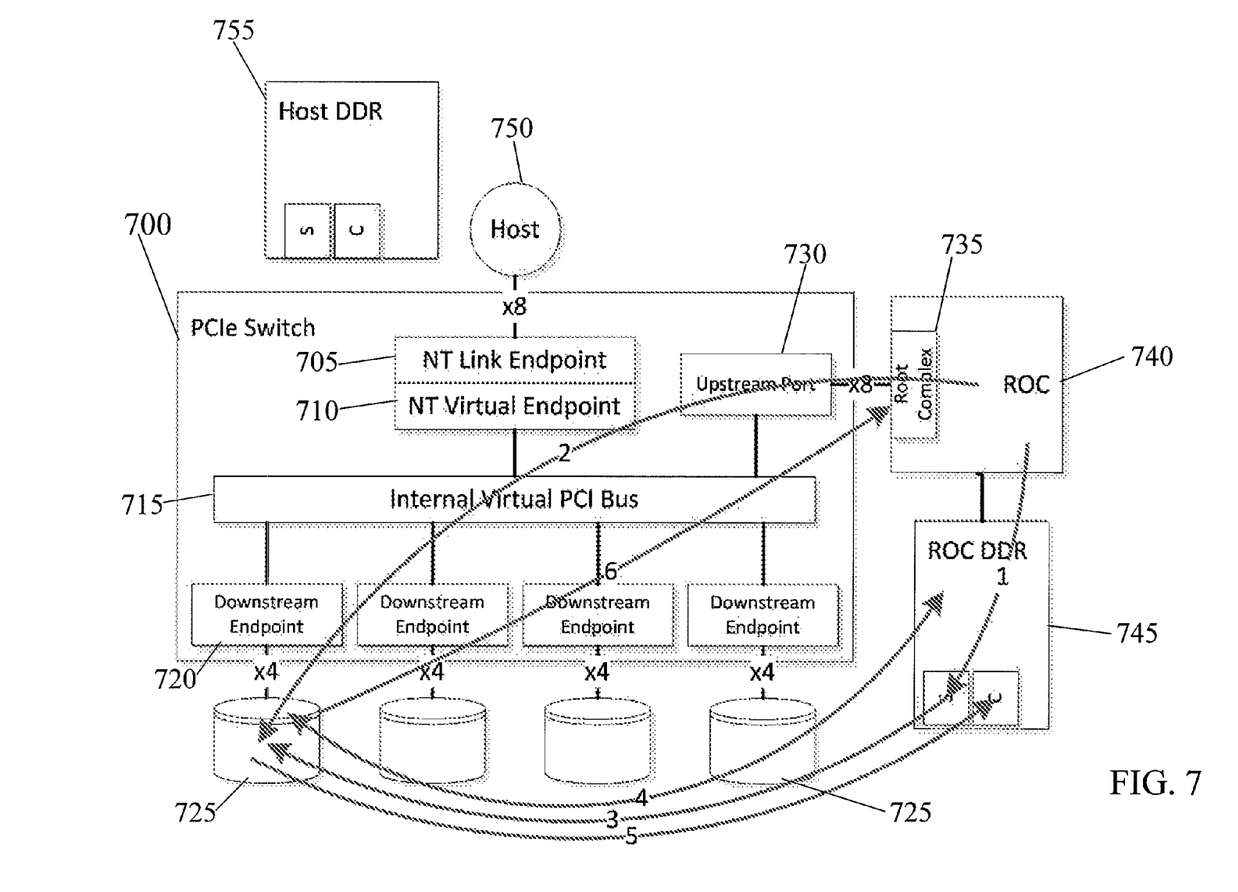
FIG. 7 shows a flow diagram indicating an I/O that is generated by an ROC and is submitted directly to the PCI device.

FIG. 7 shows a flow diagram indicating an I/O that is generated by an ROC and is submitted directly to the PCI device. The SGL specifies a source or destination buffer that resides in the ROC DDR 745. The PCIe switch 700 comprises a NT Link Endpoint 705 and an NT virtual endpoint 710. The Endpoints 705, 710 connect to an internal virtual PCI bus 715 which in turn connects to a series of downstream endpoints 720. The downstream endpoints connect to a series of drives 725. The internal Virtual PCI bus 715 also connects to an upstream port 730 which in turn connects to a RAID controller SAS ROC 740. The RAID controller SAS ROC 740 comprises a root complex 735 for receiving the inputs from the upstream port 730. A host 750 generates the I/O directly to the PCIe Switch 700.

Continuing with FIG. 7, a plurality of flows is also shown. As noted, the SGL specifies a source or destination buffer that resides in the ROC DDR 745 memory space. In flow 1, the ROC 740 builds a command (w/Host SGL) for the ROC DDR 745. In flow 2, the ROC 740 enqueues a request to a drive 725. In flow 3, the drive 725 receives a direct memory access command from the ROC DDR 745. In flow 4, the drive 725 responds to the flow 3 command and provides direct memory access either to or from the ROC DDR 745. In flow 5, the drive 725 writes a completion entry. In flow 6 the drive 725 sends an MSI-x interrupt to the ROC 740.

Figure 8:
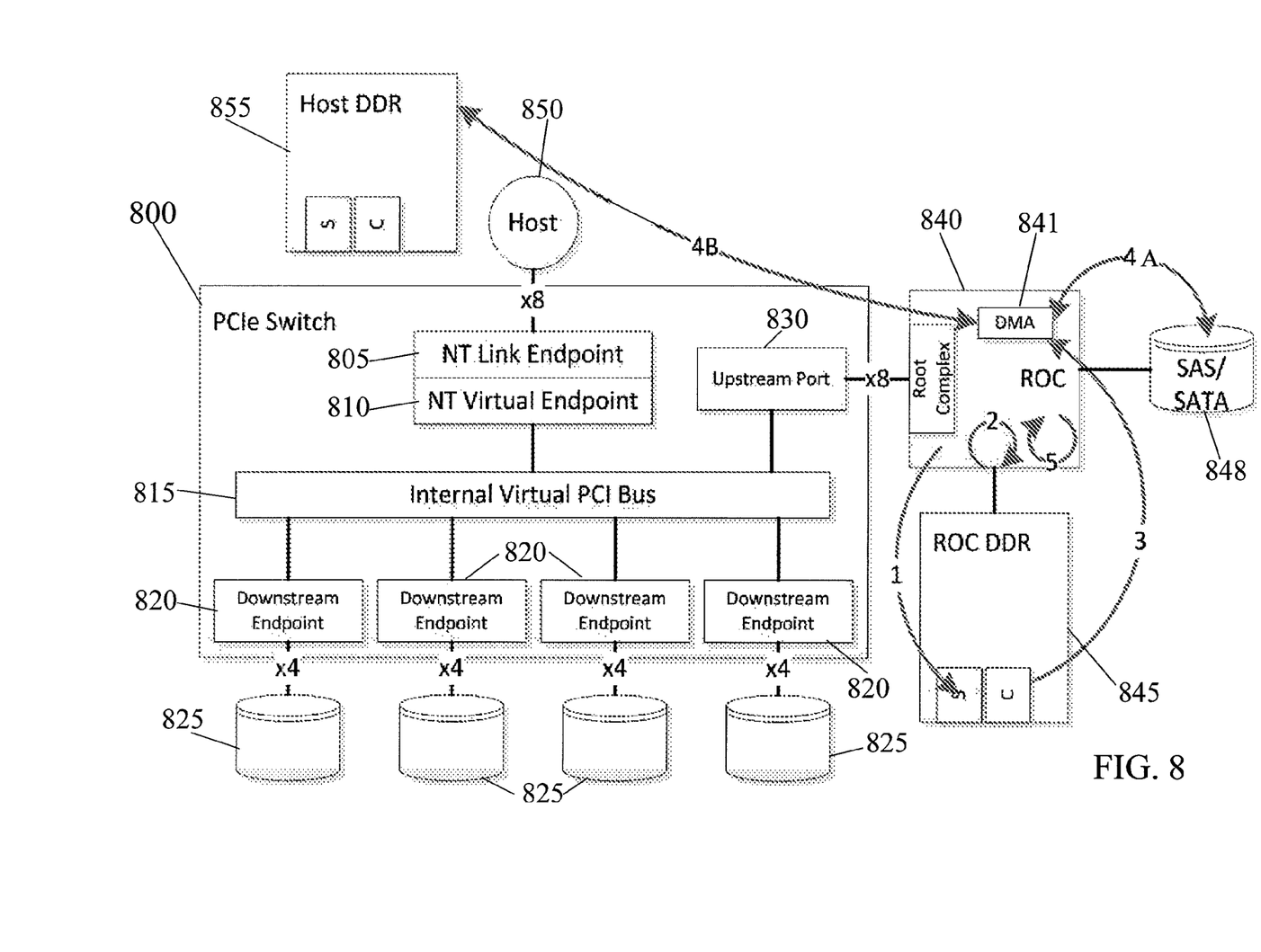
FIG. 8 shows a flow diagram indicating an I/O generated by and ROC and submitted to an SAS or SATA device.

FIG. 8 shows a flow diagram indicating an I/O generated by and ROC and submitted to an SAS or SATA device. The SGL specifies a source or destination buffer that resides in Host 850 memory space. The PCIe switch 800 comprises a NT Link Endpoint 805 and an NT virtual endpoint 610. The Endpoints 805, 810 connect to an internal virtual PCI bus 815 which in turn connects to a series of downstream endpoints 620. The downstream endpoints connect to a series of drives 825. The internal Virtual PCI bus 815 also connects to an upstream port 830 which in turn connects to a RAID controller SAS ROC 840. The RAID controller SAS ROC 840 comprises a root complex 635 for receiving the inputs from the upstream port 830. A host 850 generates the I/O directly to the PCIe Switch 800.

Continuing with FIG. 8, a plurality of flows is also shown. As noted, the SGL specifies a source or destination buffer that resides in Host 850 memory space. In flow 1 the ROC builds a command (w/ROC SGL) for the ROC DDR 845. In flow 2, the ROC 840 enqueues a request to the SAS core. In flow 3, ROC 840 receives a direct memory access request from the ROC DDR 845. In flow 4, in response to the flow 3 request, the ROC DMA 841 provides direct memory access data to, and/or from, the Host DDR 855. In flow 5 the SAS core writes a completion entry.

Figure 9:
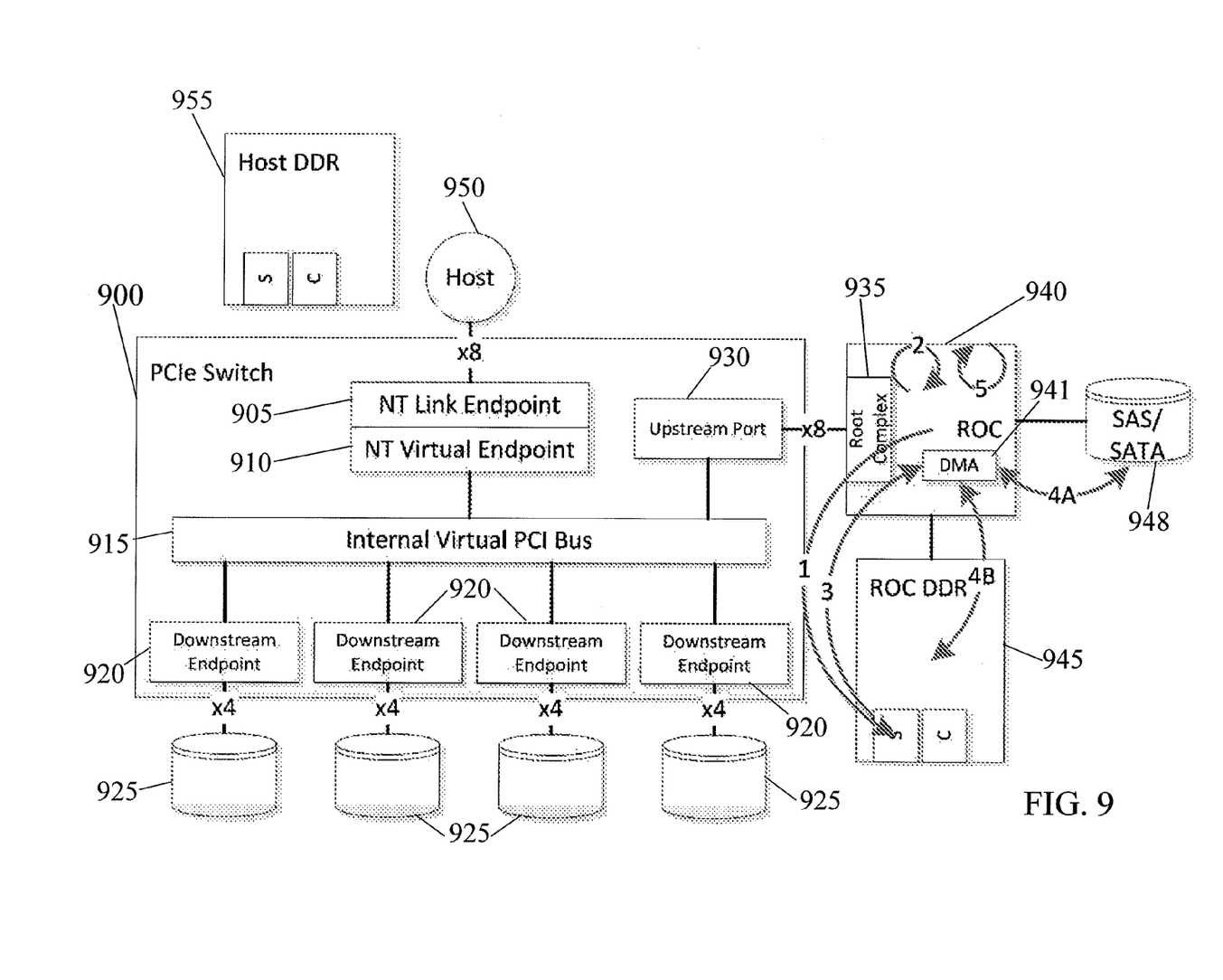
FIG. 9 shows a flow diagram indicating an I/O that is generated by an ROC and is submitted to an SAS or SATA device.

FIG. 9 shows a flow diagram indicating an I/O that is generated by an ROC and is submitted to an SAS or SATA device. The SGL specifies a source or destination buffer that resides in ROC DDR 945. The PCIe switch 900 comprises a NT Link Endpoint 905 and an NT virtual endpoint 910. The Endpoints 905, 910 connect to an internal virtual PCI bus 915 which in turn connects to a series of downstream endpoints 920. The downstream endpoints connect to a series of drives 925. The internal Virtual PCI bus 915 also connects to an upstream port 930 which in turn connects to a RAID controller SAS ROC 940. The RAID controller SAS ROC 940 comprises a root complex 935 for receiving the inputs from the upstream port 930. A host 950 generates the I/O directly to the PCIe Switch 900.

Continuing with FIG. 9, a plurality of flows is also shown. As noted, the SGL specifies a source or destination buffer that resides in ROC DDR 945 memory space. In flow 1 the ROC 940 builds a command (w/ROC SGL) for the ROC DDR 945. In flow 2 the ROC 940 enqueues a request to the SAS core. In flow 3, the ROC DDR 945 issues a direct access memory command to the SAS core. In flow 4, the ROC 940 responds to the command and provides direct memory access either to or from the ROC DDR 945. The flow 4 is shown as both flow 4A and flow 4B to indicate the interaction of the SAS/SATA device 948. In flow 5 the SAS core writes a completion entry.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage control apparatus, comprising:
    a Peripheral Component Interconnect Express (PCIe) switch operable to interface with a host system to switch Input/Output (I/O) requests from the host system to a plurality of storage drives; and
    Redundant Array of Independent Disks (RAID) controller module communicatively coupled to the PCIe switch and comprising a computer memory mapped to a computer memory of the host system through the PCIe switch,
    wherein the RAID controller module is operable to implement a RAID storage management on a portion of the storage drives through the PCIe switch, to direct memory access (DMA) data from the host computer memory to the computer memory of the RAID controller module through the PCIe switch, and to DMA the data from the computer memory of the RAID controller module to any of the portion of the storage drives according to the implemented RAID storage management.

2. The storage control apparatus of claim 1, wherein:
    the computer memory of the RAID controller module is further operable to cache other data from the host system.

3. The storage control apparatus of claim 1, wherein:
    the plurality of storage drives comprise hard disk drives (HDDs) coupled to the RAID controller module and solid state drives (SSDs) coupled to the PCIe switch.

4. The storage control apparatus of claim 3, wherein:
    the RAID controller module is further operable to process completion entries from the SSDs acknowledging completed DMAs to the SSDs from the computer memory of the RAID controller module through the PCIe switch.

5. The storage control apparatus of claim 3, wherein:
    the PCIe switch is further operable to transfer completion entries to the host system from the SSDs and the HDDs acknowledging completed DMAs thereto.

6. A method operable in a storage system comprising a Peripheral Component Interconnect Express (PCIe) switch, a Redundant Array of Independent Disks (RAID) controller module communicatively coupled to the PCIe switch, and a plurality of storage drives, the method comprising:
    implementing a RAID storage management on a portion of the storage drives through the PCIe switch;
    direct memory accessing (DMAing) data from host computer memory to the computer memory of the RAID controller module through the PCIe switch; and
    DMAing the data from the computer memory of the RAID controller module to any of the portion of the storage drives according to the implemented RAID storage management.

7. The method of claim 6, further comprising:
    caching other data from the host system to the computer memory of the RAID controller module through the PCIe switch.

8. The method of claim 6, wherein:
    the plurality of storage drives comprise hard disk drives (HDDs) and solid state drives (SSDs).

9. The method of claim 8, the method further comprising:
    processing, at the RAID controller module, completion entries from the SSDs acknowledging completed DMAs to the SSDs from the computer memory of the RAID controller module through the PCIe switch.

10. The method of claim 8, further comprising:
    transferring completion entries through the PCIe switch to the host system from the SSDs and the HDDs acknowledging completed DMAs thereto.

11. The method of claim 8, further comprising:
    implementing the RAID storage management on the HDDs through a direct connection of the HDDs to the RAID controller module.

12. A non-transitory computer readable medium comprising instructions that when executed by one or more processors of a storage system comprising a Peripheral Component Interconnect Express (PCIe) switch, a Redundant Array of Independent Disks (RAID) controller module communicatively coupled to the PCIe switch, and a plurality of storage drives, direct the one or more processors to:
    implement a RAID storage management on a portion of the storage drives through the PCIe switch;
    direct memory access (DMAing) data from host computer memory to the computer memory of the RAID controller module through the PCIe switch; and
    DMA the data from the computer memory of the RAID controller module to any of the portion of the storage drives according to the implemented RAID storage management.

13. The computer readable medium of claim 12, further comprising instructions that direct the one or more processors to:
    cache other data from the host system to the computer memory of the RAID controller module through the PCIe switch.

14. The computer readable medium of claim 12, wherein:
    the plurality of storage drives comprise hard disk drives (HDDs) and solid state drives (SSDs).

15. The computer readable medium of claim 14, the further comprising instructions that direct the one or more processors to:

process, at the RAID controller module, completion entries from the SSDs acknowledging completed DMAs to the SSDs from the computer memory of the RAID controller module through the PCIe switch.

16. The computer readable medium of claim 14, further comprising instructions that direct the one or more processors to:
transfer completion entries through the PCIe switch to the host system from the SSDs and the HDDs acknowledging completed DMAs thereto.

17. The computer readable medium of claim 14, further comprising instructions that direct the one or more processors to:
implement the RAID storage management on the HDDs through a direct connection of the HDDs to the RAID controller module.

* * * * *